March 14, 1939.  H. P. PHILLIPS  2,150,457
PISTON RING ASSEMBLY
Filed June 4, 1936
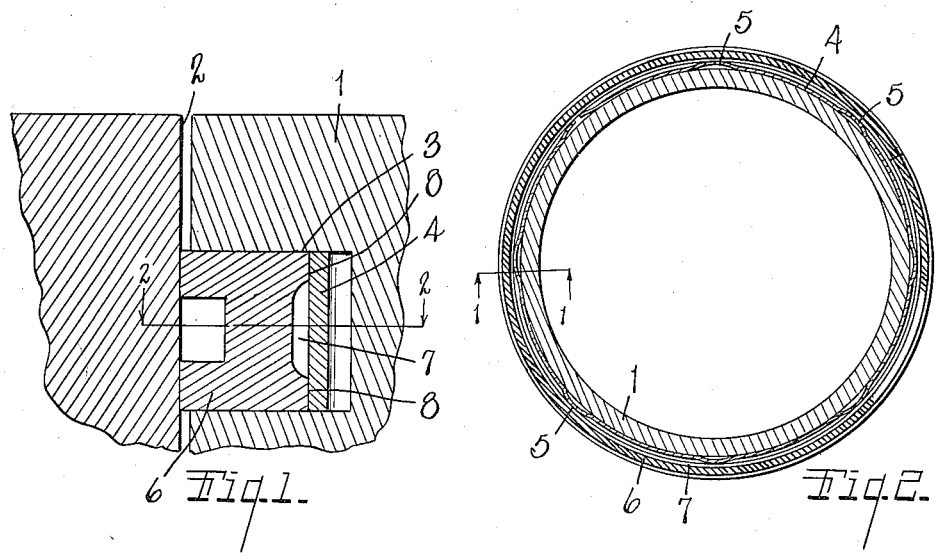
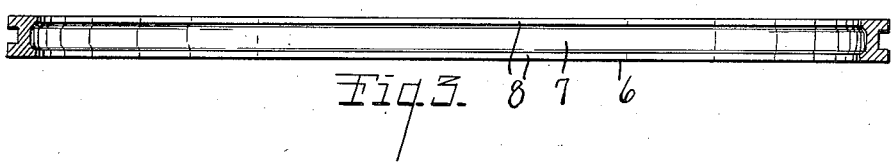
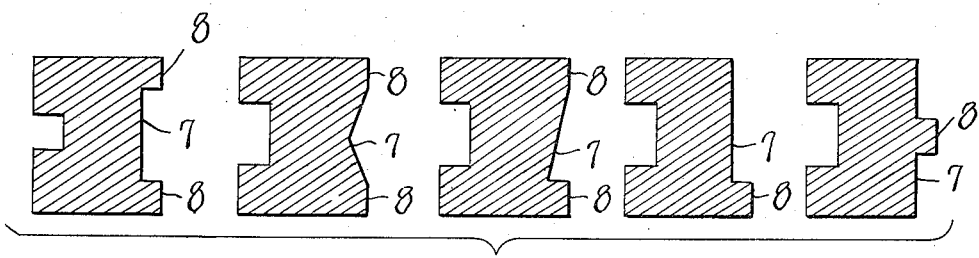
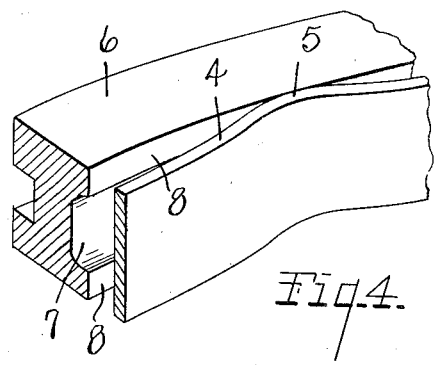
INVENTOR.
Harold P. Phillips
BY
Chappell, Earl T. Chappell
ATTORNEYS Patented Mar. 14, 1939

2,150,457

UNITED STATES PATENT OFFICE 2,150,457

PISTON RING ASSEMBLY

Harold P. Phillips, Hastings, Mich., assignor to Hastings Manufacturing Company, Hastings, Mich.

Application June 4, 1936, Serial No. 83,461

9 Claims. (Cl. 309—44)

The main objects of this invention are:

First, to provide a piston ring centering assembly comprising a split cast iron expansible ring and an inner ring of steel, said assembly being characterized by its long wearing qualities.

Second, to provide an assembly of the type described, wherein the effective life of the assembly and of the tension of the inner ring is prolonged.

Third, to provide a novel piston ring, of compression, scraper or oil type, having provision whereby wear on an inner expanding spring employed therewith is greatly reduced.

Objects relating to details and economies of the invention will appear from the description to follow. The invention is defined in the claims.

Preferred embodiments of the invention are illustrated in the accompanying drawing, wherein:

Fig. 1 is a fragmentary view in section along the line 1—1 of Fig. 2, illustrating the coaction of a piston and ring assembly associated therewith with the cylinder wall of an internal combustion engine, the parts being very greatly magnified and no attempt made to preserve proportional accuracy in order to clearly show the construction.

Fig. 2 is a plan view in section on the line 2—2 of Fig. 1.

Fig. 3 is a view in transverse vertical section of the ring.

Fig. 4 is a fragmentary perspective view more clearly illustrating the relation of the inner ring with the cast iron ring and the function of my novel formation of the latter ring.

Fig. 5 illustrates various forms of ring sections constituting embodiments of the invention.

The use of an inner steel expanding spring in conjunction with a split cast iron outer piston ring in an internal combustion engine is well known. Heretofore, however, considerable wear has resulted on the portions of the inner ring exposed to frictional contact with the cast iron ring, greatly reducing the tension of the same and consequently causing a failure of the inner ring to properly center the cast iron ring relative to the piston. It is the purpose of this invention to remedy this defect and I have accomplished the purpose by reducing the area of contact between the inner and outer rings in a manner to be hereinafter described.

Referring to the drawing, the reference numeral 1 indicates the piston of an internal combustion engine operating in a cylinder 2 and provided with ring grooves 3. An inner split steel expanding ring 4 is seated in the groove, being provided with a plurality of rounded crimps 5 which bear against the outer split ring 6 of cast iron.

I have illustrated the ring 6 as being a compression ring. However, the construction of my invention is equally advantageously applied in the case of an oil ring and I do not wish to be limited in this respect.

The main function of the steel inner ring is to maintain the outer cast iron ring properly centered with respect to the piston and to thereby properly center the piston with respect to the cylinder and maintain the desired tension. Due to the considerable frictional effect between the meeting surfaces of the inner ring 4 and the outer ring 3, objectionable wearing has heretofore resulted at the crimps 5, tending to weaken or reduce the tension of the inner ring at these points and, in some cases, to destroy the ring. I have found that this tendency is effectively overcome and wear reduced practically to the vanishing point by means of an annular channel 7 which I form centrally of the cast iron ring on the inner side thereof, or the side facing the bottom of the piston ring groove. The annular channel provides a pair of annular lands 8 at either side thereof, which are the contacting surfaces for the inner steel ring 4.

In Fig. 1, the channel 7 as illustrated is of a substantial width, having rounded fillets joining the innermost circumference of the ring, while in Fig. 5 a number of alternative constructions are suggested, all of which are equally effective. Such modified forms include a channel of square cross section, or a channel formed by a pair of lines meeting centrally of the ring and inwardly of the inner circumference, or a channel formed by a single angled line. The three modified forms mentioned provide a pair of annular lands 8 of the type illustrated in Fig. 1. Further modifications may consist of an annular recess formed in the outer ring providing a land at the upper or lower side of the ring or a pair of annular recesses resulting in an annular land 8 at the central portion of the ring.

In any of the forms above described, the surface of the land is parallel to the outer face of the outer ring and the area of contact between the outer cast iron ring and the inner steel ring is substantially reduced. The life of the inner ring's tension is greatly prolonged. The importance of this result is apparent when it is considered that wear on a crimp of the inner ring of only a few thousandths of an inch materially reduces the inner ring's tension. This wear is believed largely to be the result of abrasion from carbon or other foreign substances present between the two rings. Therefore, reduction of the contacting surface between the rings reduces the possibility of accumulation of such substances between the rings and also permits abrasive substance to work out from under the point of contact of the rings in case it lodges there.

The depth of the annular channel usually cut is approximately from .007 to .010 inch, although I do not wish to be limited unduly as to this dimension. Generally speaking, however, the channel for a compression or scraper ring is relatively shallow—more so than the channels usually cut for the distribution of oil in the case of an oil ring.

I have illustrated and described my improvements in embodiments which I have found very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent, is:

1. In combination, an expansible split piston ring of cast iron and an inner ring of steel adapted to be seated under said piston ring in a piston groove, said inner ring having a plurality of rounded crimps, said piston ring having an inner central circumferential channel providing spaced circumferential lands at either side of the groove, said lands being parallel to the axis of the piston ring and contacting the inner ring, whereby wear is substantially diminished, said channel being approximately .007–.010 inch in depth.

2. In combination, an expansible split piston ring and an inner ring adapted to be seated under said piston ring in a piston groove, said piston ring having an inner central circumferential channel providing spaced circumferential lands at either side of the groove, said lands being parallel to the axis of the piston ring and contacting the inner ring, whereby wear is substantially diminished, said channel being approximately .007–.010 inch in depth.

3. In combination, an expansible split piston ring and an inner ring adapted to be seated under said piston ring in a piston groove, said piston ring having an inner circumferential channel providing spaced circumferential lands at either side of the groove, said lands contacting the inner ring, said lands protruding radially a distance only sufficient to remove the inner ring from contact with the rest of the piston ring, whereby wear is substantially diminished, the axial dimension of said inner ring being substantially equal to the axial dimension of the piston ring.

4. In combination, an expansible split compression piston ring and an inner ring adapted to be seated under said piston ring in a piston groove, said piston ring having an inner circumferential groove providing a circumferential land parallel to the axis of the piston ring and extending inwardly and contacting the inner ring, whereby wear is substantially diminished, the depth of said groove being approximately .007–.010 inch.

5. A split expansible compression piston ring of cast iron having an inner central circumferential channel providing spaced circumferential lands adapted to contact a resilient inner centering ring at spaced points whereby wear on the last named ring is diminished, the depth of said channel being approximately .007–.010 inch.

6. A split expansible compression piston ring having an inner circumferential channel providing spaced circumferential lands adapted to contact a resilient inner centering ring at spaced points whereby wear on the last named ring is diminished, said lands protruding radially a distance only sufficient to remove the inner ring from contact with the rest of the piston ring.

7. A split expansible piston ring having an inner circumferential channel approximately .007–.010 inch in depth providing a circumferential land extending inwardly and at one side of said ring, said land being parallel to the axis of the ring and adapted to contact a resilient inner centering ring at spaced points whereby wear on the last named ring is diminished.

8. In combination, a split piston ring and an inner ring adapted to be seated under said piston ring in a piston groove, said inner ring engaging said piston ring to center the piston ring relative to the piston, said piston ring having an internal circumferential land at one side of the first named ring and contacting the inner ring, whereby wear is substantially diminished, said land protruding radially a distance only sufficient to remove the inner ring from contact with the rest of the piston ring, the surface of said land being parallel to the axis of the piston ring.

9. A piston ring having an inner central channel providing spaced circumferential lands adapted to contact a resilient inner centering ring at spaced points whereby wear on the last named ring is diminished, said lands protruding radially a distance only sufficient to remove the inner ring from contact with the rest of the piston ring, the surface of said lands being parallel to the axis of the piston ring.

HAROLD P. PHILLIPS.